(12) United States Patent
Sakai et al.

(10) Patent No.: US 7,259,891 B2
(45) Date of Patent: Aug. 21, 2007

(54) IMAGE COMPRESSION METHOD, DECOMPRESSION METHOD THEREOF AND PROGRAM THEREFOR

(75) Inventors: Kenichiro Sakai, Kawasaki (JP); Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 980 days.

(21) Appl. No.: 10/326,980

(22) Filed: Dec. 24, 2002

(65) Prior Publication Data

US 2003/0123087 A1    Jul. 3, 2003

(30) Foreign Application Priority Data

Dec. 27, 2001   (JP)   ............... 2001-397714

(51) Int. Cl.
*H04N 1/41*   (2006.01)
(52) U.S. Cl. .................... 358/1.9; 358/426.01
(58) Field of Classification Search ............. 358/1.9, 358/3.21, 448, 426.01, 426.02; 382/232, 382/245–246
See application file for complete search history.

(56) References Cited

U.S. PATENT DOCUMENTS 5,777,749 A    7/1998   Noda et al.

*Primary Examiner*—Thomas D. Lee
*Assistant Examiner*—Stephen Brinich
(74) *Attorney, Agent, or Firm*—Staas & Halsey LLP

(57) ABSTRACT

In a method of image compression in which vertical and horizontal white skipping are performed, data compression is performed in the regions containing black pixels other than the skipped regions. While vertical and horizontal white skipping being performed, in the other regions, regions are detected in which pixel values change in smooth fashion, such as the outlines of letters and encoding is performed using the pixel value of the leading column of the region, number of columns and amount of change of the pixel values. As a result, the compression factor of the image can be increased and a considerable contribution made to reduce the storage capacity for storage of data and reduce the time required for data transmission.

8 Claims, 13 Drawing Sheets

ENCODED DATA = CODE WORD + START VALUE +
DIRECTION OF CHANGE OF PIXEL VALUE
+ NUMBER OF COLUMNS M + NUMBER OF SHIFT PIXELS
( $N_1 + N_2 + N_3 + \cdots N_{M-1}$ )

ENCODED DATA = CODE WORD + START VALUE +
  DIRECTION OF CHANGE OF PIXEL VALUE
  + NUMBER OF COLUMNS M + NUMBER OF SHIFT PIXELS N

FIG. 9(A)

| COLUMN PIXEL VALUE A | COLUMN PIXEL VALUE B | FLAG INDICATING WHETHER OR NOT TARGET IS DETECTED TARGET (1:DETECTED TARGET, 0:NON-DETECTED TARGET) | CHANGE DIRECTION OF BLACK PIXEL | NUMBER OF CHANGE PIXEL |
|---|---|---|---|---|

⎵_____⎵  ⎵_____⎵
ADDRESS PORTION                    DATA PORTION

FIG. 9(B)

| COLUMN PIXEL VALUE A | COLUMN PIXEL VALUE B | FLAG | CHANGE DIRECTION OF BLACK PIXEL | NUMBER OF CHANGE PIXEL |
|---|---|---|---|---|
| ⋮ | | | | |
| 00111100 | 00111110 | 1 | 1 (DOWN) | 1 |
| ⋮ | | | | |
| 00111100 | 01111100 | 1 | 0 (UP) | 1 |
| ⋮ | | | | |
| 00111100 | 00111000 | 1 | 0 (UP) | 1 |
| ⋮ | | | | |
| 00111100 | 00011100 | 1 | 1 (DOWN) | 1 |
| ⋮ | | | | |

100 → row 2; 102 → row 4; 104 → row 6; 106 → row 8

IMAGE COMPRESSION METHOD, DECOMPRESSION METHOD THEREOF AND PROGRAM THEREFOR

BACKGROUND OF THE INVENTION

1. Field of the Invention

The present invention relates to an image compression method for improving the compression factor of a binary bit map image, a decompression method thereof and a program therefor and in particular relates to an image compression method that performs blank skipping in the horizontal and vertical directions, a decompression method thereof and a program therefor.

2. Description of the Related Art

With increasing use of high image resolutions in recent years, data compression techniques are being employed for transmission and storage of binary bit map images. Conventional methods of compression of binary bit map images that have been proposed include MH (modified Huffman), MR (Modified READ), MMR (Modified Modified READ) and JBIG (Joint Bi-level Image Group); these are widely used for storage of files and/or FAX, etc.

With these compression methods, the encoding processing required in order to raise the compression rate is complicated so that time is required for processing of a high-resolution image. Bit map data compression methods aimed at speeding up the rate of processing have therefore been proposed (for example Laid-open Japanese Patent Application number H. 8-51545).

FIG. 15 shows a diagram of such a prior art image compression method. As shown in FIG. 15, first of all an input image A is scanned in the horizontal (main scanning) direction in units of a prescribed number of lines K (for example single line units), and continuous blank lines as between rows in units of a prescribed number of lines L (for example units of 8 lines) are encoded as a vertical skip and non-blank line regions are separated as logical rows B.

Next, the separated logical rows B is scanned in the vertical (auxiliary scanning) direction in single-column units, and regions containing black pixels of non-blank regions are separated by horizontal skipping of blank regions, such as for example between letters, that do not contain black pixels.

Then, in each logical row, regions consisting solely of white pixels (blank regions) and regions consisting solely of black pixels are encoded so as to be skipped by designating their respective column numbers. Next, regions C and E having continuous columns of the same pixel value are encoded using this pixel value and the number of such repetitions. In regions D other than those containing black pixels, the pixel data in this region are output as encoded data without modification together with the column numbers.

Such a method of compression is suitable for high-speed data compression of text documents, in which there are a comparatively large number of blanks.

In the bit map data compression method described above, as shown in FIG. 15, among regions C, D and E other than those containing black pixels, the regions C and E having a fixed height (pixel value) in the auxiliary scanning direction are compressed by encoding with this height (pixel value) and column number. However, the regions D in which the pixel values are changing smoothly such as for example the outline portions of the letters cannot be compressed with the conventional method of compressing solely the portions where the same pixel columns are continuous, since the pixel values are changing; the image data must therefore be output without modification: there was therefore the problem requiring improvement that the image compression factor needed to be raised.

SUMMARY OF THE INVENTION

An object of the present invention is to provide an image compression method, decompression method and program therefor for further improving the compression factor of image compression in which vertical skipping and horizontal skipping are performed.

A further object of the present invention is to provide an image compression method, decompression method and program therefor for further improving the compression factor of the remaining regions containing black pixels after performing vertical skipping and horizontal skipping.

Yet a further object of the present invention is to provide an image compression method, decompression method and program therefor for further improving the compression factor of the remaining regions containing black pixels after performing vertical skipping and horizontal skipping by encoding portions wherein the pixel values change gradually.

In order to achieve this object, a method of image compression according to the present invention includes: a first region separating step of separating into regions containing black pixels and regions not containing black pixels in units of K rows (where K is an integer of one or more) by scanning an image in a main scanning direction; a second region separating step of separating regions containing black pixels and regions not containing black pixels in single column units by scanning in an auxiliary scanning direction intersecting this main scanning direction in logical rows defined by L (where L is an integer of one or more) rows including at least one row containing black pixels obtained by the first region separating step; a third region separating step of separating regions in which black pixels increase or decrease continuously in the same direction of the auxiliary scanning direction in the logical row in accordance with the separation results of said second region separating step; and an encoding step of encoding by using the regions obtained in said first, second and third region separating step as elements; wherein the encoding step includes a step of encoding the regions separated by said third region separating step with the number of columns of said region, the pixel value of the leading column of the region and the amount of change of the black pixels of each column of the second and subsequent columns of said region with respect to the immediately preceding column.

Also, a method of image decompression according to the present invention for decompressing compressed data obtained by separating into regions containing black pixels and regions not containing black pixels in units of K rows (where K is an integer of one or more) by scanning an image in a main scanning direction, separating regions containing black pixels and regions not containing black pixels in single column units by scanning in an auxiliary scanning direction intersecting this main scanning direction in logical rows defined by L (where L is an integer of one or more) rows including at least one row containing black pixels, separating into regions in which black pixels increase or decrease continuously in the same direction of the auxiliary scanning direction in the logical row and encoding by using each the separated regions as elements, includes the steps of: analyzing a code word of the region from the compressed data; and restoring regions in which black pixels increase or decrease continuously in the same direction of the auxiliary scanning direction in the logical row obtained by said analysis, from the number of columns of the region, the pixel values of the leading column of the region and the amount of change of black pixels with respect to the immediately preceding column of the second and subsequent columns of the region contained in the code word.

Also, an image compression program according to the present invention includes: a first region separating program data for separating into regions containing black pixels and regions not containing black pixels in units of K rows (where K is an integer of one or more) by scanning an image in a main scanning direction; a second region separating program data for separating regions containing black pixels and regions not containing black pixels in single column units by scanning in an auxiliary scanning direction intersecting this main scanning direction in logical rows defined by L (where L is an integer of one or more) rows including at least one row containing black pixels obtained by the first region separating program data; a third region separating program data for separating regions in which black pixels increase or decrease continuously in the same direction of the auxiliary scanning direction in the logical row in accordance with the separation results of said second region separating program data; and an encoding program data for encoding by using the regions obtained in said first, second and third region separating program data as elements; wherein the encoding program data includes program data for encoding the regions separated by said third region separating program data with the number of columns of said region, the pixel value of the leading column of the region and the amount of change of the black pixels of each column of the second and subsequent columns of said region with respect to the immediately preceding column.

Also, an image decompression program according to the present invention for decompressing compressed data obtained by separating into regions containing black pixels and regions not containing black pixels in units of K rows (where K is an integer of one or more) by scanning an image in a main scanning direction, separating regions containing black pixels and regions not containing black pixels in single column units by scanning in an auxiliary scanning direction intersecting this main scanning direction in logical rows defined by L (where L is an integer of one or more) rows including at least one row containing black pixels, separating into regions in which black pixels increase or decrease continuously in the same direction of the auxiliary scanning direction in the logical row and encoding by using each the separated regions as elements, includes: analyzing program data for analyzing a code word of the region from the compressed data; and restoring program data for restoring regions in which black pixels increase or decrease continuously in the same direction of the auxiliary scanning direction in the logical row obtained by said analysis, from the number of columns of the region, the pixel values of the leading column of the region and the amount of change of black pixels with respect to the immediately preceding column of the second and subsequent columns of the region contained in the code word.

With the method of image compression according to the present invention, vertical and horizontal blank skipping is performed and, in regions other than this, regions where the pixel values change gradually in a specified direction are separated and encoded in accordance with the direction of change and amount of change of the black pixels so the compression factor of portions where the change of pixel values satisfies specific conditions, such as the boundary portions of letters, which were conventionally output without coding, can be improved. This therefore contributes to reduction of the storage capacity for storing data and reduction of the data transmission time.

Furthermore, with the method of image compression according to the present invention, preferably the third region separating step includes a step of separating regions in which black pixels increase or decrease continuously in the same direction in accordance with the relationship of black pixels of adjacent columns of the region containing black pixels.

Furthermore, according to the present invention, preferably the third region separating step includes a step of separating regions in which black pixels increase or decrease continuously in the same direction by using the pixel values of adjacent columns to reference a separation criteria table stored information indicating the subject of detection, the direction of change and the amount of change corresponding to the pixel values of these two columns.

Furthermore, according to the present invention, preferably the encoding step includes a step of encoding using a single code indicating this amount of change when the amount of change of black pixels in each column in the region separated by said third region separating step is constant.

Furthermore, according to the present invention, preferably the encoding step includes a step of expressing the code indicating the amount of change of the number of black pixels of each column by N bits satisfying M $2^N-1$ (where N is an integer of one or more) when the amount of change of the number of black pixels of each column in the region separated by the third region separating step is a maximum M pixels.

BRIEF DESCRIPTION OF THE DRAWINGS

FIGS. 9(A) and 9(B) show diagrams of the constitution of a separation decision table according to FIG. 7;

DESCRIPTION OF THE PREFERRED EMBODIMENTS

The description of embodiments of the present invention given below follows the order: method of image compression, system to which this is applied, method of compression processing, method of decompression processing, and other embodiments.

[Method of Image Compression]

Figure 1:
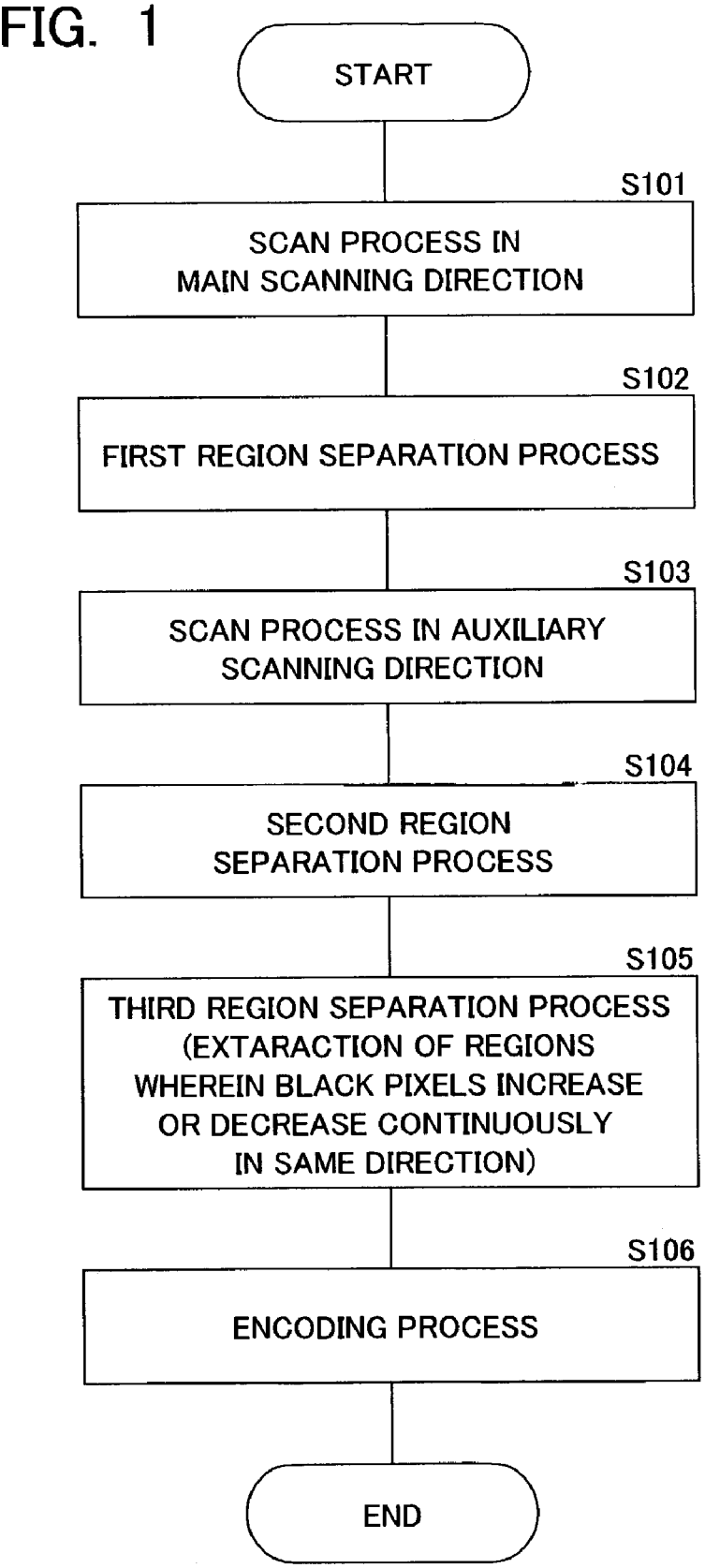
FIG. 1 shows a flow chart of the overall processing of a method of image compression according to an embodiment of the present invention.
Figure 2:
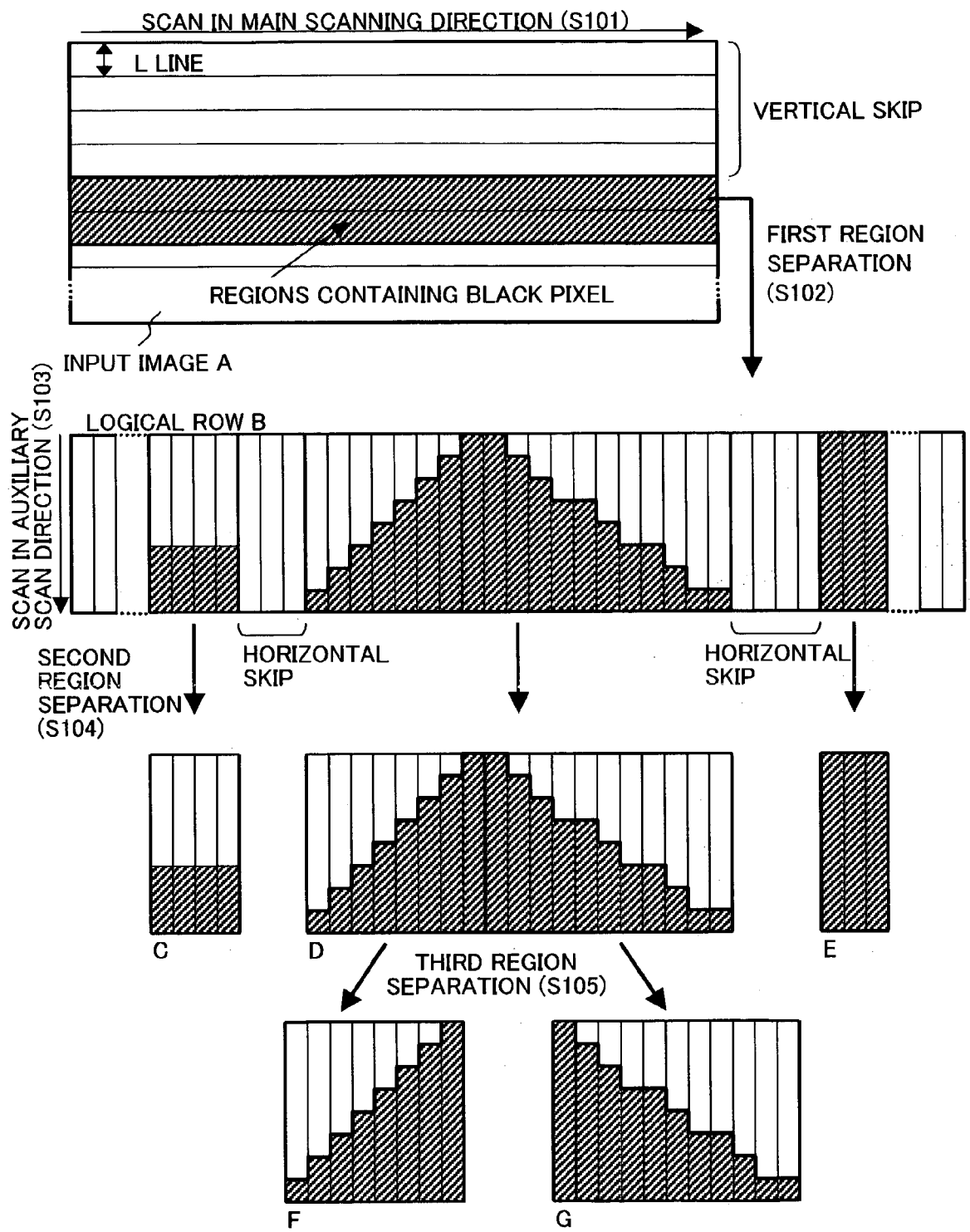
FIG. 2 shows a diagram of the method of image compression of FIG. 1.
Figure 3:
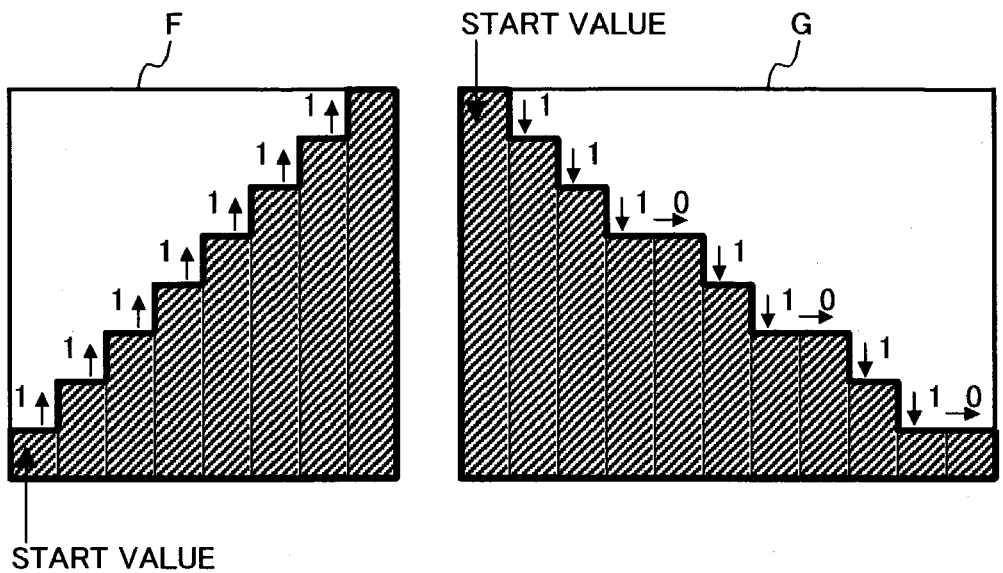
FIG. 3 shows diagrams of the constitution of the image compression pattern of FIG. 2.
Figure 4:
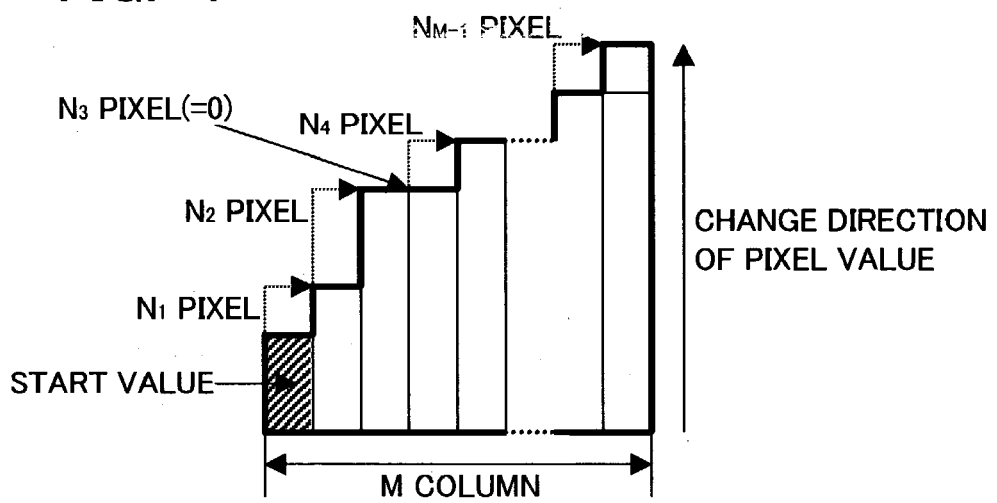
FIG. 4 shows a diagram of encoded data of FIG. 1.

FIG. 1 is a flow chart of the overall processing of a method of image compression according to an embodiment of the present invention; FIG. 2 is a diagram of the method of image compression of FIG. 1; and FIG. 3 and FIG. 4 are diagrams of the method of encoding of FIG. 2. The overall processing in accordance with FIG. 1 will be described with reference to FIG. 2.

(S101) First of all, the input image A is scanned in units of K lines (for example 1 line) in the horizontal direction (main scanning direction).

Figure 15:
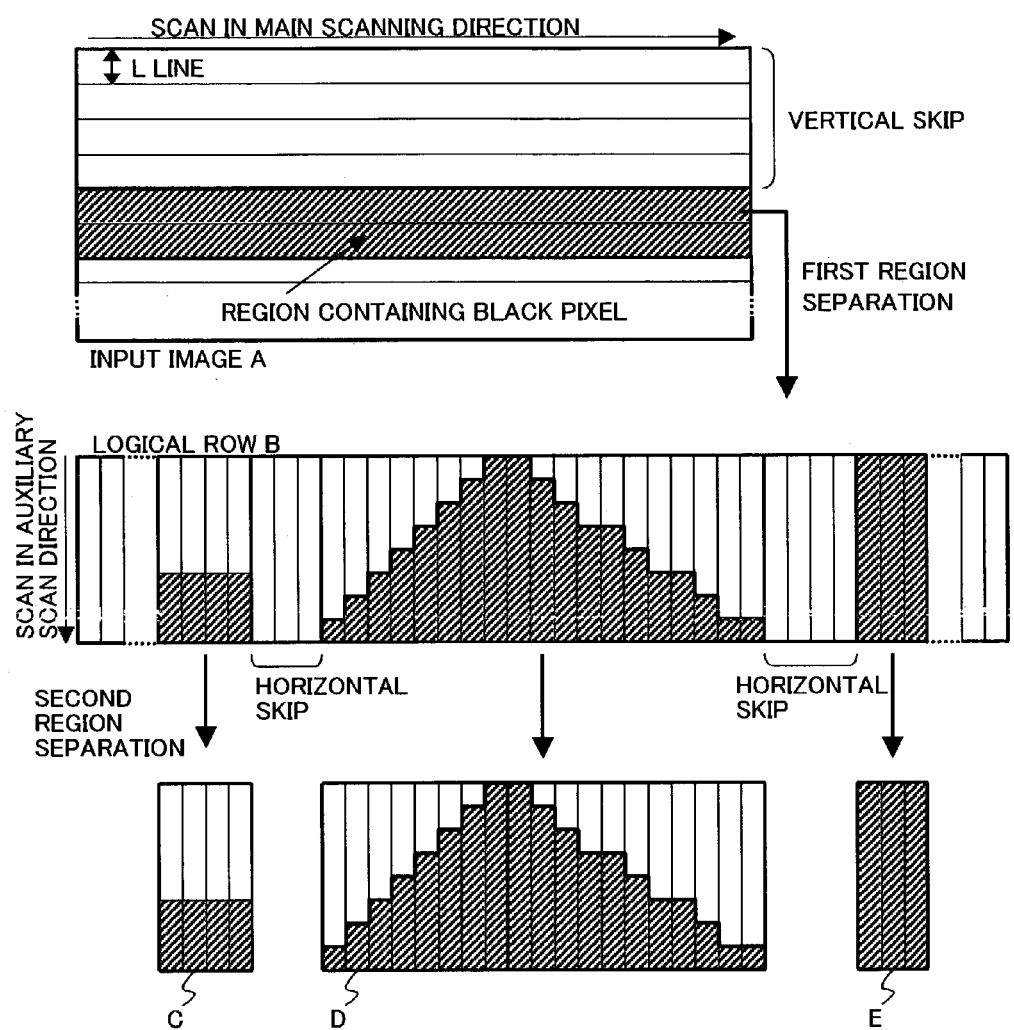
FIG. 15 shows a diagram of a prior art method of image compression.

(S102) By the main scanning, separation is performed into regions that do not contain any black pixels at all and regions that do contain black pixels, for each of prescribed number L of lines (for example eight lines as in the case of FIG. 15) and vertical skipping of continuous blank lines is performed as between rows. On the other hand, regions that do contain black pixels are separated as logical rows B.

(S103) Next, in the separated logical rows (eight lines) B, scanning is performed in the vertical direction (auxiliary scanning direction) in single column units.

(S104) By the vertical scanning, separation is performed, in units of a single column, into regions that do contain black pixels and regions that do not contain black pixels. And, non-blank regions that do contain black pixels are separated from the blank regions by skipping the blank regions that do not contain black pixels such as between letters. In FIG. 2, separation is performed into horizontally skipped regions and regions C, D, E other than these.

(S105) Using the region separation results of S104, the region D is separated into the regions F and G wherein the black pixels increase or decrease continuously in the same direction of the auxiliary scanning direction.

(S106) Encoding is performed taking the regions obtained by the separation processes of S102, S104 and S105 as elements.

That is, according to the present invention, step S105 is added and the encoding of step S106 is further added to the prior art proposals described above. Steps S105 and S106 are described in detail with reference to FIG. 3. In FIG. 3, the amount of change of the black pixels compared with the preceding column is indicated for each column by a numerical value for region F and G of FIG. 2.

Specifically, sequentially from the leading row of the region, it is determined, from the relationship between the pixel value (length of black pixels) of the preceding column and the pixel value of the current column whether the black pixels are continuously increasing or decreasing in the same direction and the pixel rows in which the black pixels are continuously increasing in the same direction and the pixel rows in which the black pixels are continuously decreasing in the same direction are then separated.

The separated regions are then encoded by the pixel value of the leading column of the region, the number of columns of this region and the amount of change of the black pixels of each column. The encoded data size of this region is thereby decreased.

For example, as shown in FIG. 4, the encoded data is constituted by a code word (identifier of the pattern in question), starting value (pixel value of the leading column), direction of change of the pixel value, number of columns M, and number of shift pixels (amount of change of black pixels). When, as in the case of region G of FIG. 4 or FIG. 3, the amount of change of the black pixels with respect to the preceding column is different, the number of shift pixels is constituted by the number of altered pixels N1, N2 . . . with respect to the preceding column of each column, other than the leading column.

Figure 5:
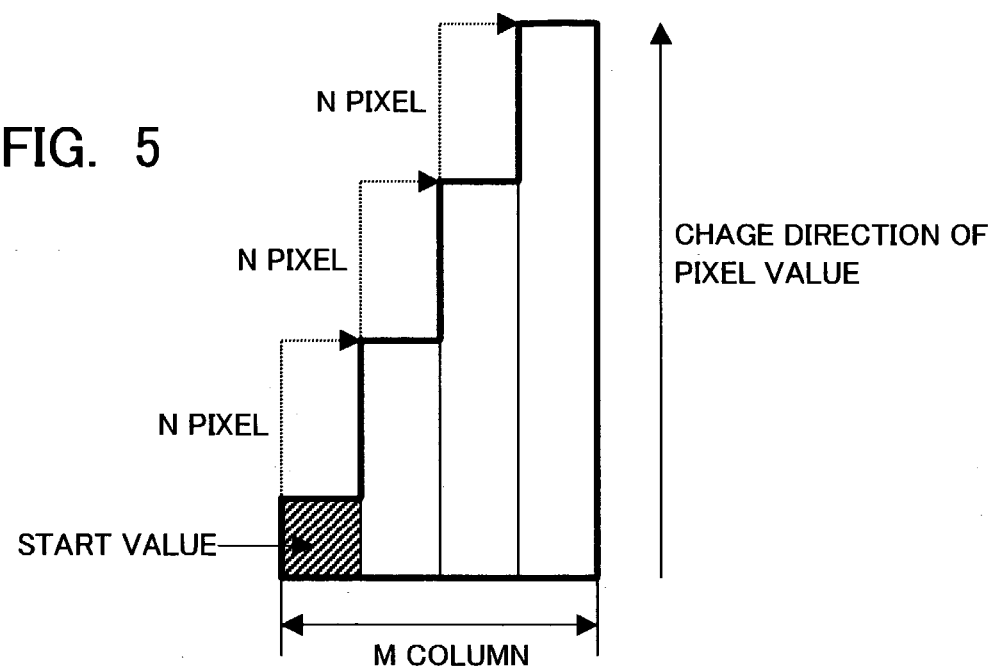
FIG. 5 shows a further diagram of encoded data of FIG. 1.

In contrast, when, as in the case of region F of FIG. 3 as shown in FIG. 5, the amounts of change of black pixels with respect to the preceding column are all the same, instead of encoding the amounts of change for each column, encoding is effected using only the amount of change N of a single one. In this way, the encoded data size can be reduced even further.

As the number of bits of the number of these shift pixels, N bits are allocated satisfying $M=2^N-1$, where the maximum amount of change of the black pixels of the region is taken as being M pixels. In the case of pixels where the amount of change of black pixels is the maximum M=1, N=1 bit is allocated; in the case where M=up to 3, N=2 bits are allocated; and in the case of pixels where M=up to 7, N=3 bits are allocated. In this way, the number of bits allocated to the code indicating the amount of change of black pixels can be kept to the necessary minimum.

As described above, the pattern of a region containing black pixels separated in a logical row is not encoded directly but rather, it is ascertained whether each column of the region is a column in which the black pixels are continuously increasing or continuously decreasing in the same column direction. And regions where the black pixels are continuously increasing or decreasing in the same column direction are extracted and this region is encoded with the pixel value and amount of change of the leading column. Considerable data compression can thereby be achieved in portions where the pixel values are changing smoothly, such as the outlines of letters. The binary bit map data file storage capacity can therefore be reduced and transmission time can be shortened.

[System to Which this is Applied]

Figure 6:
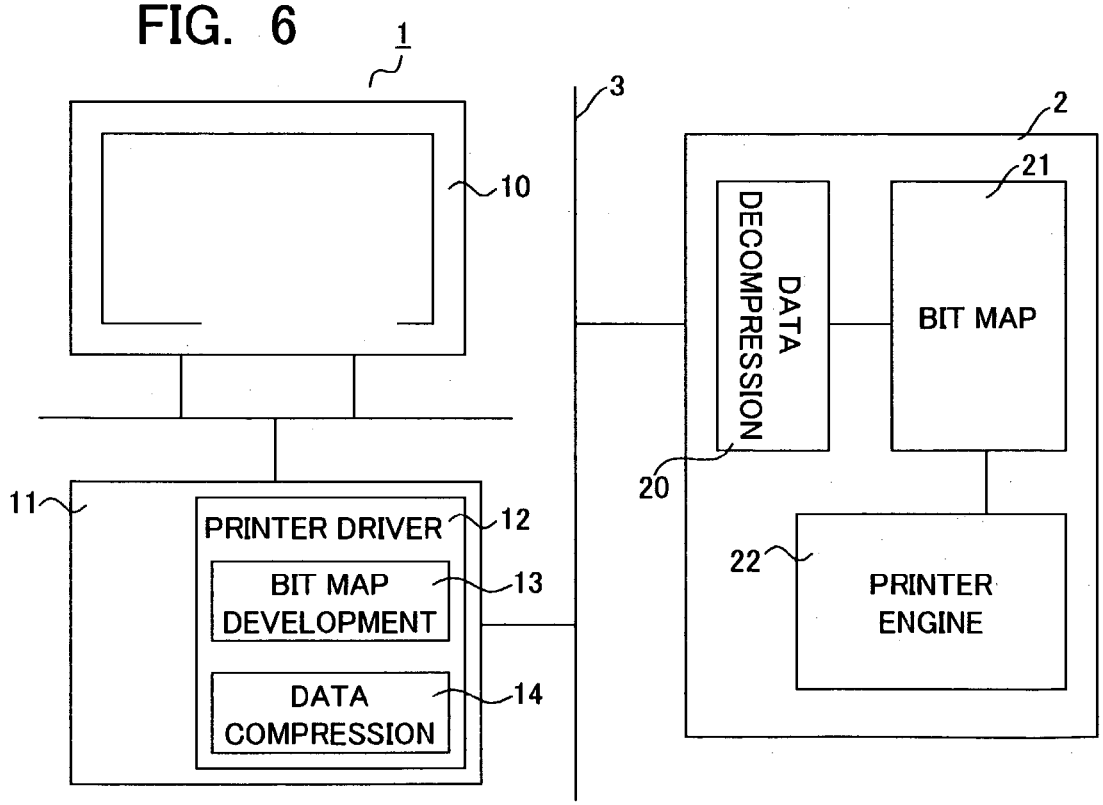
FIG. 6 shows a diagram of a system to which the image compression method according to the present invention is applied.

FIG. 6 is a layout diagram of a system suited to the application of the method of image compression and restoration of the present invention. A client 1 such as a personal computer and a printer 2 are connected by a network (for example LAN) 3. The client 1 comprises a display 10 and a data processing unit 11. A printer driver 12 is installed in the data processing unit 11.

The printer driver 12 comprises a bit mapping program 13 and an image compression program 14. The bit mapping program 13 converts the data to be printed of client 1 into bit map data of designated resolution. The image compression program 14 compresses bit map data (an input image) in accordance with the present invention and transmits this to the printer 2 through the network 3.

The printer 2 comprises an image restoration program 20, bit map memory 21 and printer engine 22. The image restoration program 20 restores (decompress) the compressed data that is transmitted and stores this in the bit map memory 21. The printer engine 22 is constituted by for example an electro-photographic printer engine and prints on a printing medium the bit map data that was stored in the bit map memory 21.

In this system, the client 1 creates printing data which have been bit mapped. In contrast, the printer 2 receives printing data obtained by bit map development and performs a printing operation thereupon. In this system, in view of the increase in the image processing performance that has been achieved by increases in personal computers speed in recent years, creation of high-resolution (for example 1200 dpi) bit map data is entrusted to the client 1.

Consequently, high-resolution printing can still be achieved even if the printer 2 is not given such a high-resolution bit map data generating function. That is, the printer 2 does not need to have a high-resolution image-drawing function, so high-resolution printing can be performed with an inexpensive printer. Furthermore, since the performance of client 1 is improved, the bit mapping time is reduced. However, the transmission time when high-resolution bit mapped data is transmitted becomes long. Image compression and restoration are performed in order to shorten this transmission time. The printing time for the client 1 can also thereby be shortened.

[Method of Compression Processing]

Figure 7:
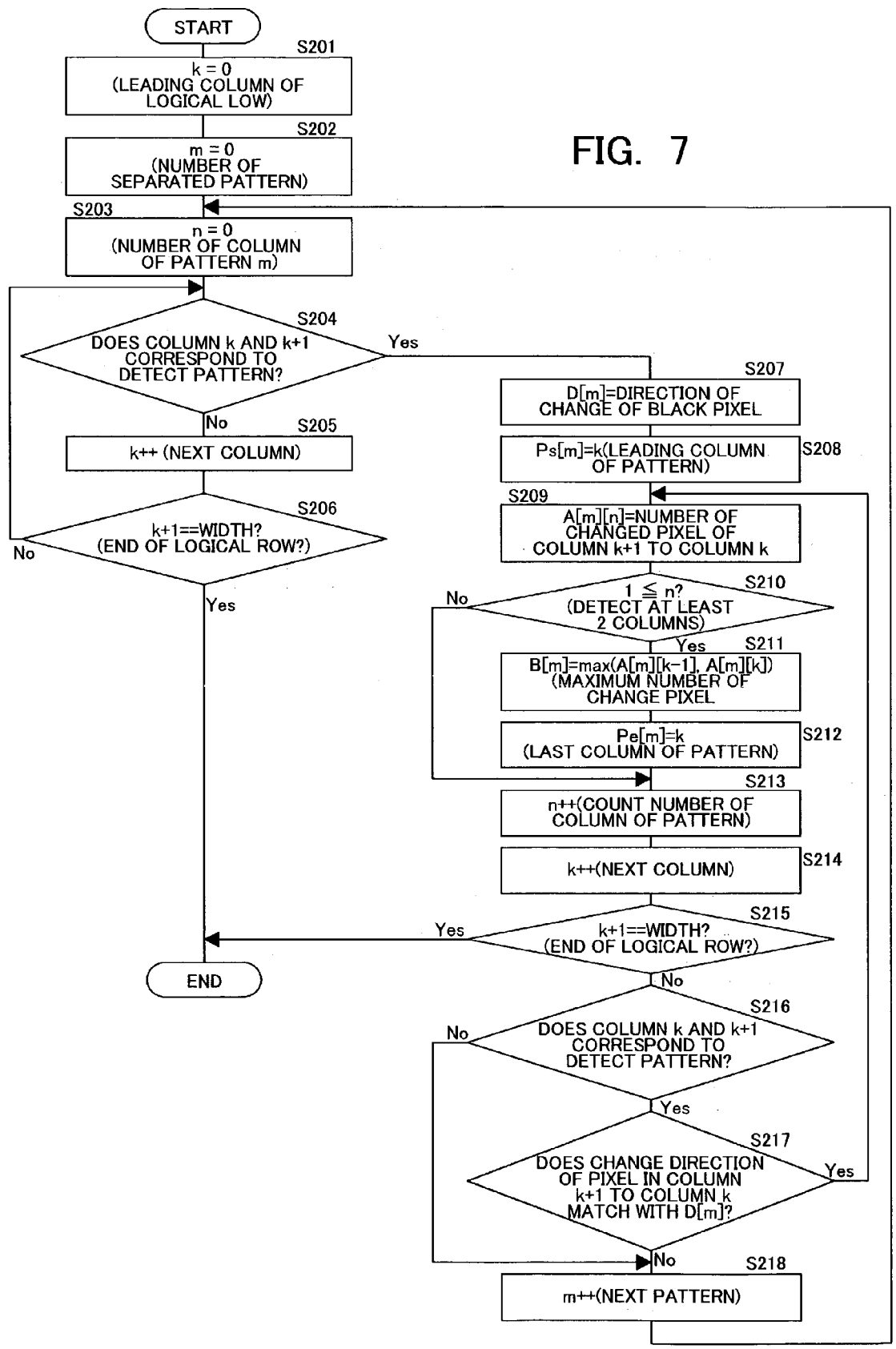
FIG. 7 shows a flow chart of image compression processing according to an embodiment of the present invention.

Next, image compression processing according to an embodiment of the present invention will be described. FIG. 7 is a flow chart of image compression processing according to an embodiment of the present invention; FIGS. 8(A), 8(B), 8(C) and 8(D) are diagrams of an altered pattern of pixel values of an adjacent column of an example of the detection pattern of FIG. 7; and FIGS. 9(A) and 9(B) are diagrams of the constitution of a separation decision table according to FIG. 7.

FIG. 7 corresponds to the processing of step S105 in the overall processing shown in FIG. 1. The processing of step S105 will be described with reference to FIGS. 8(A) to 8(D) and FIG. 9.

(S201) "0" indicating the initial column of the logical row is set in variable k indicating the reference column number.

(S202) The variable m indicating the number of separated patterns is cleared to "0".

(S203) The variable n indicating the column number of separated patterns is cleared to "0".

(S204) A decision is made as to whether or not the column k that is currently being referred to and the next column k+1 correspond to the separated pattern. When it is decided that neither column corresponds to the separated pattern, processing advances to S205; when it is decided that they do correspond, processing jumps to S207. The criteria for this decision are described in FIG. 8(A) to FIG. 8(D).

Figure 8A:
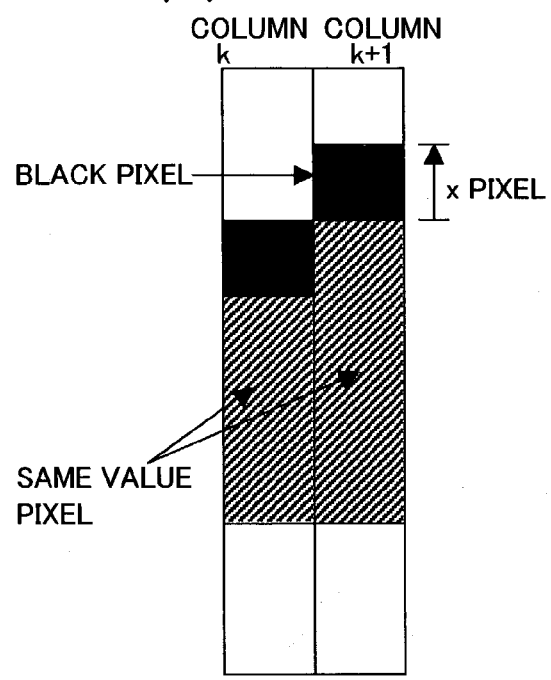
FIGS. 8(A), 8(B), 8(C) and 8(D) show diagrams of the detection pattern of FIG. 7.
Figure 8B:
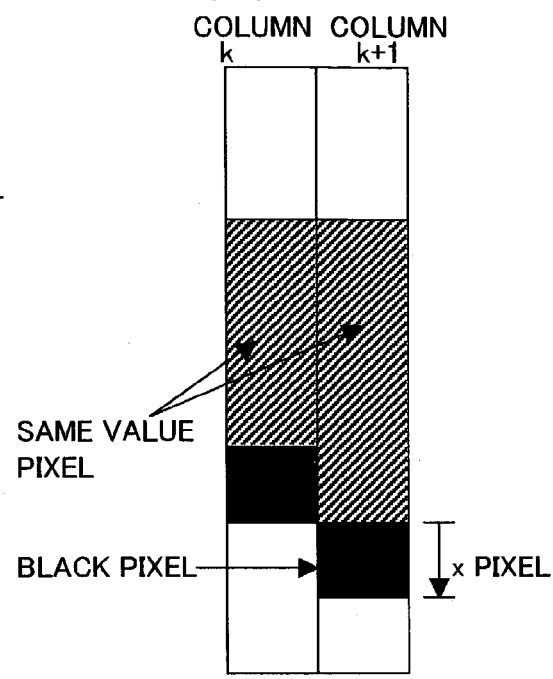
Figure 8C:
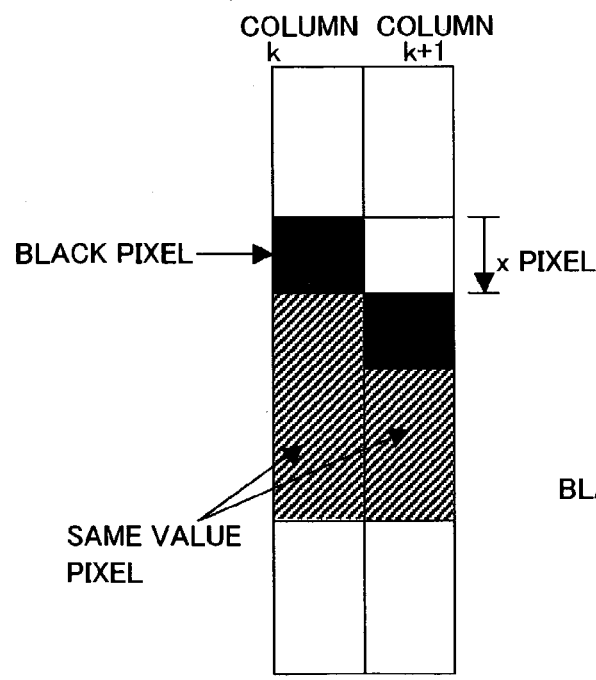
Figure 8D:
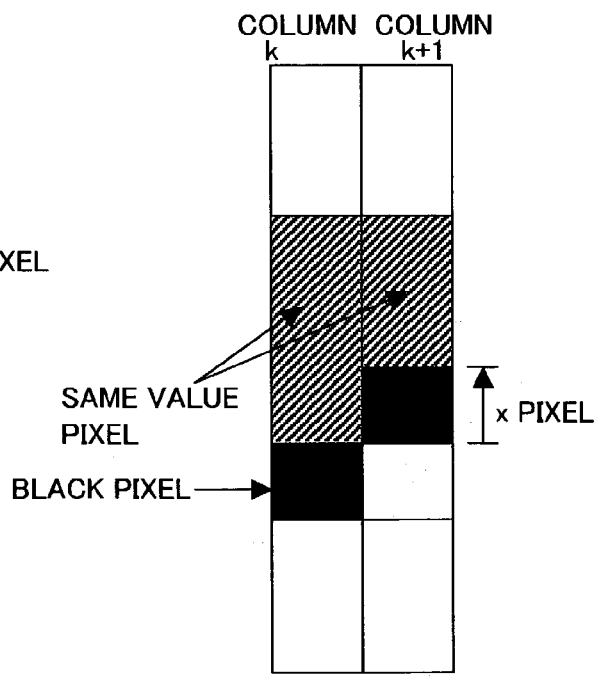

When this is a pattern which is separated, the relationship of column k and column k+1 corresponds to one or other of the patterns of FIG. 8(A) to FIG. 8(D). Specifically, regarding the pixel value of column k+1 with respect to column k, FIG. 8(A) is a pattern in which the black pixels increase by x pixels in the upwards direction of the column, FIG. 8(B) is a pattern in which the black pixels increase by x pixels in the downwards direction of the column, FIG. 8(C) is a pattern in which the black pixels decrease by x pixels in the downwards direction of the column and FIG. 8(D) is a pattern in which the black pixels decrease by x pixels in the upwards direction of the column. This x is an integer of "0" or above.

For this decision to as to whether correspondence exists or not, the separation decision Table shown in FIGS. 9(A) and 9(B) may be employed. As shown in FIG. 9(A), this Table stores, for all combinations of column pixel values, a flag indicating whether or not correspondence exists (indicating whether this is detected or not), the direction of change of the black pixels and the number of changed pixels, using the pixel values A, B of the two columns as address.

Specifically, the Table is so constituted that, by referring to the Table, using the pixel values of the two columns in question as address, the existence of correspondence, the direction of change of the black pixels and the number of changed pixels can be simultaneously obtained.

It should be noted that, prior to the commencement of the processing of FIG. 7, the content of the Table is set beforehand in accordance with the relationships of FIGS. 8(A) to 8(D). For example, if a logical row is taken as 8 lines i.e. a one column 8 bit pixel value is assumed, as shown in FIG. 9(B), Table T comprises 256×256 combinations. For each of these combinations, a flag indicating whether or not correspondence exists (indicating whether this is detected or not), the direction of change of the black pixels and the number of changed pixels are set. For example, assuming x=1, the detection contents of FIG. 8(A) to FIG. 8(D) respectively correspond to the columns 102, 100, 106 and 104 of Table T. Likewise, even in the case of x=0 (case where successive columns have the same value), a flag of "1" indicating detection is set in Table T.

(S205) The column number k is then incremented by "1" in order to reference the next column.

(S206) A decision is then made as to whether or not column k+1 exceeds the last column. If it does exceed the last column, processing is terminated. If it does not exceed the last column, processing returns to S204.

(S207) The change in direction of the black pixels obtained by referring to Table T of FIG. 9(B) is stored in D[m] addressed by the pixel values of column k and column k+1 in S204. D[m] is employed in encoding the separated pattern.

(S208) The k which is the column number in the leading logical row of the separated pattern is stored in PS[m].

(S209) The number of changed pixels of column k+1 compared with column k is stored at A[m][n]. This pixel number is also obtained when referring to Table T of FIG. 9(B) using the pixel numbers of column k and column k+1 as address.

(S210) A decision is made as to whether or not n is at least '1' i.e. as to whether or not the number of columns of the detected and separated pattern is at least '2'. If the number of columns is at least '2', processing advances to S211; if the number of columns is less than '2', the processing of S211 and S212 is skipped and processing jumps to S213.

(S211) The larger of number of changed pixels A[m][k−1] and number of changed pixels A[m][k] is stored in B[m]. The maximum value of the number of changed pixels of each column of the finally separated pattern is stored in B[m] and used by the subsequent encoding processing.

(S212) The current column number k is stored in Pe[m]. Pe[m] stores the final column number in the logical row of the pattern that was finally separated. By combining Pe[m] and Ps[m], the position of the extracted pattern in the logical row can be specified and the column number of this separated pattern can be obtained and used in encoding.

(S213) "1" is added to the variable n indicating the column number of the separated pattern.

(S214) "1" is added to the variable k indicating the reference column number in the logical row.

(S215) A decision is made as to whether or not column k+1 exceeds the last column; if it does exceed this, processing is terminated. If it does not exceed the last column, processing advances to S216.

(S216) In the same way as in the case of S204, a decision is made, by referring to Table T of FIG. 9(B) as to whether or not the currently referenced column k and the next column k+1 correspond to the separated pattern. If it is decided that these two columns do not correspond to the separated pattern, processing advances to S218; if it is decided that they do correspond, processing advances to S217.

(S217) A decision is made as to whether or not the direction of pixel change of column k+1 with respect to column k obtained as a result of referencing the Table in S216 matches D[m]. That is, it is decided whether or not the direction of change of the black pixels has changed over from top to bottom or from bottom to top. If it is decided that the direction of change of the black pixels has changed over, processing of the pattern that is currently being detected is terminated and processing advances to S218. If it is decided that the direction of change of the black pixels is the same, since the pattern that is currently being separated is still continuing, processing returns to S209.

(S218) "1" is added to the variable m indicating the number of patterns that have been separated and processing returns to S203 and separation processing of the next pattern is commenced.

By performing processing as above, the targeted regions in which the black pixels increase or decrease in the same direction are separated from the logical row as individual patterns.

Figure 10:
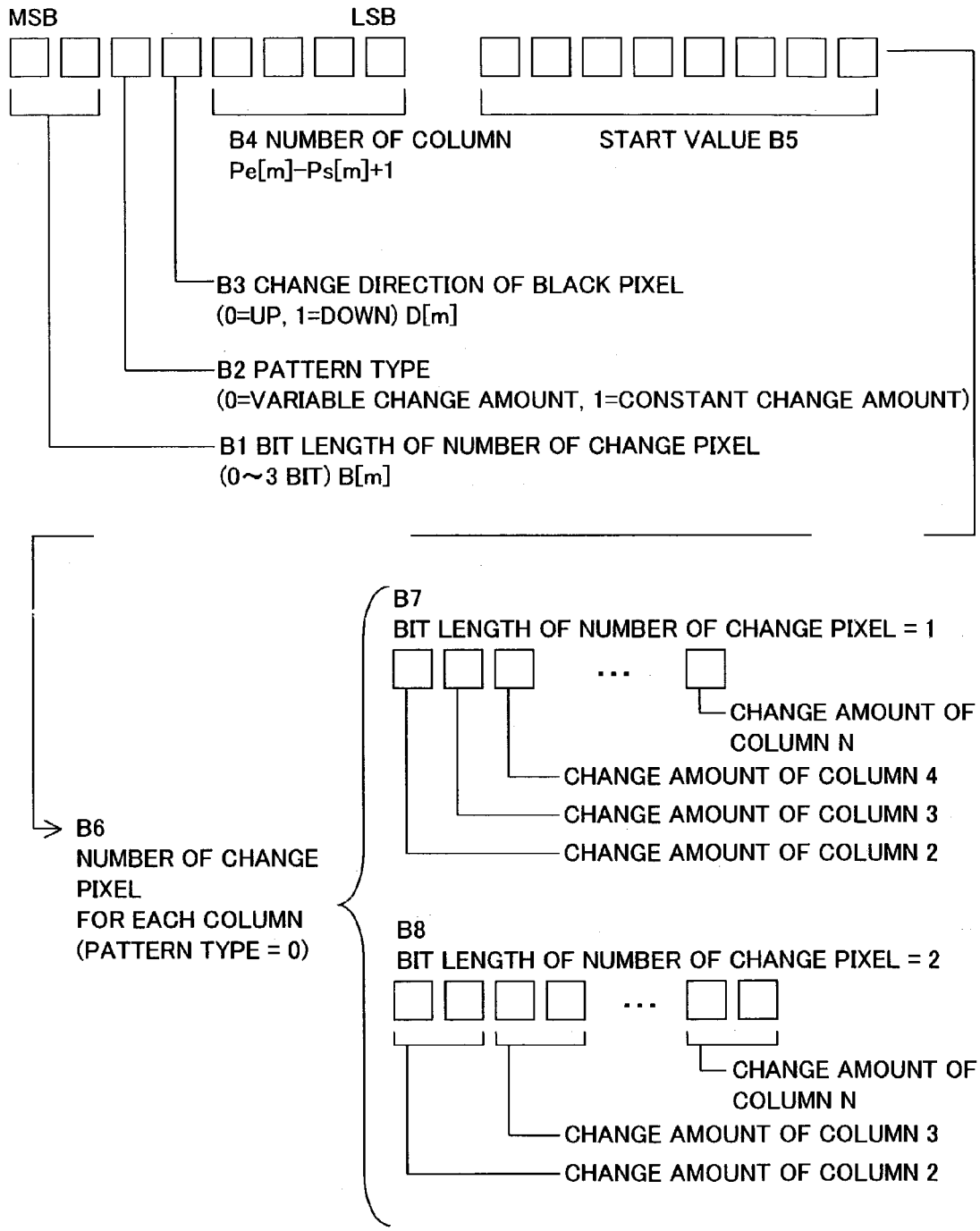
FIG. 10 show a diagram of an encoding step according to FIG. 1.

Next, encoding of the separated patterns will be described. FIG. 10 is a view showing an embodiment of the bit structure of a code word according to the present invention. The regions separated in accordance with the separation results obtained by the separation processing of FIG. 7 are encoded.

The leading bit B1 is a bit representing the bit length determined from the maximum value of the number of changed pixels and expresses the maximum bit number B[m] of the number of changed pixels of each column, to be described later. The next bit B2 is a bit designating the type of pattern, "0" representing a pattern in which the amount of change of the pixel values of each column are different and "1" representing a pattern in which the amounts of change of the pixel values of all of the columns are the same. In the former case, the amounts of change of pixel values for each column are output in coded form; in the latter case, the amounts of change of the pixel values of each column are not output in coded form.

The following bit B3 is a bit designating the direction of change of the pixel values within the column; if the direction of change of the black pixels is the upwards direction of the column, as it is in FIG. 8(A) and FIG. 8(D), this is "0"; if the direction of change of the black pixels is the downwards direction of the column, as it is in the case of FIGS. 8(B) and 8(C), this is "1".

The following bit B4 is a bit indicating the number of columns of the separated pattern. Next bit B5 is a bit designating the pixel value of the leading column of the separated pattern. Next bit B6 is a bit designating the number of changed pixels with respect to the preceding column, for each column after the leading column of the separated pattern; a code of the number (number of columns designated by B4, minus 1) is output. The bit length indicating the number of changed pixels of each column is the bit length designated by B1.

Figure 11:
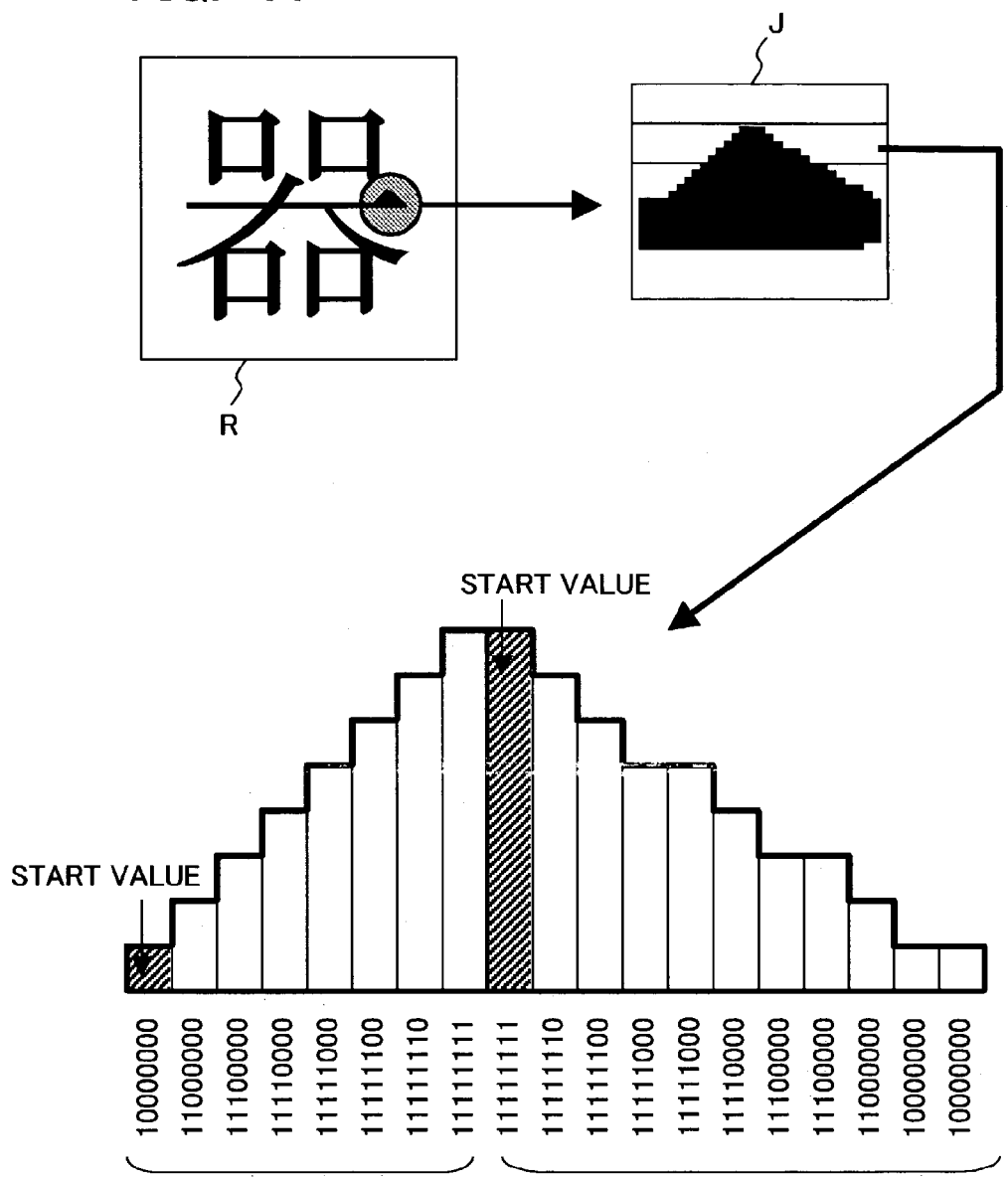
FIG. 11 show a diagram of an example of an image to which an embodiment of the present invention has been applied.
Figure 12:
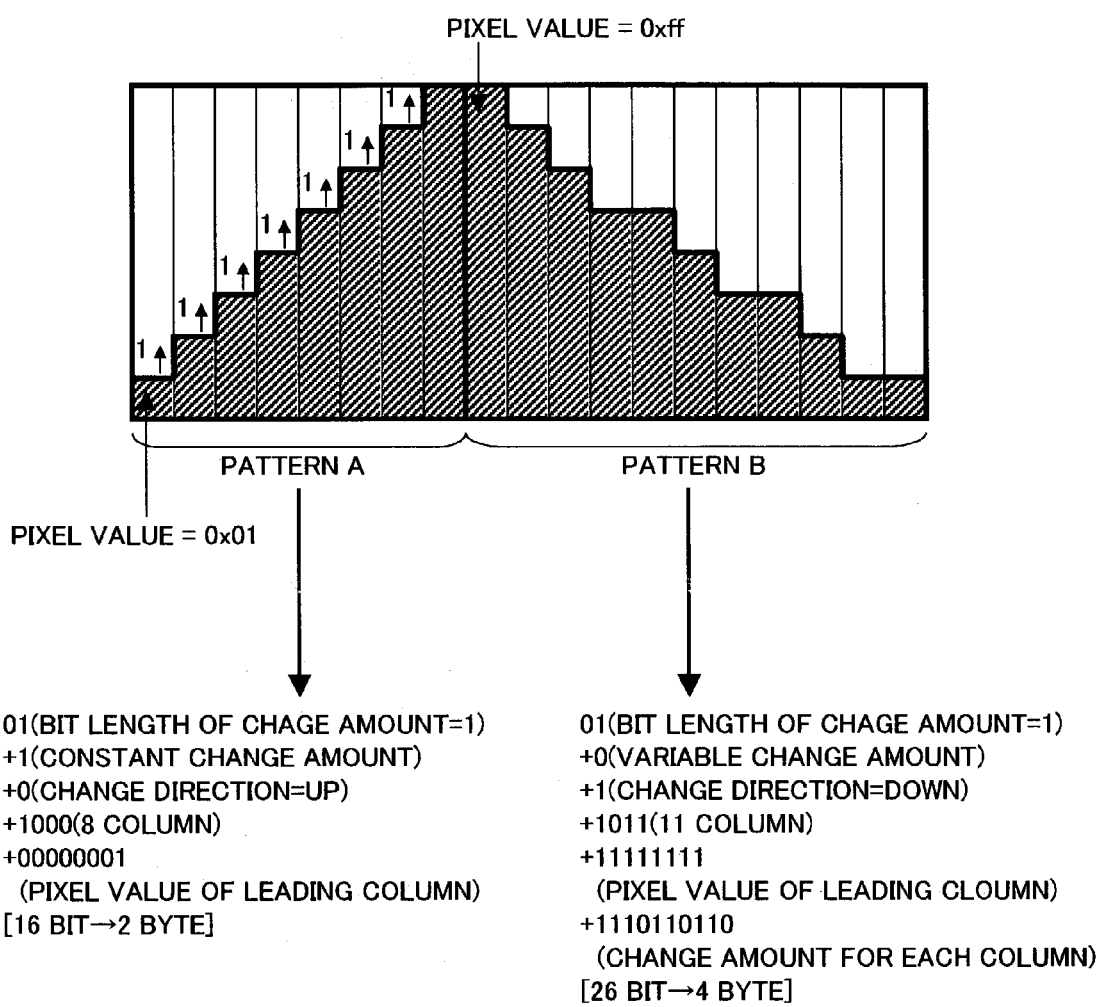
FIG. 12 shows a diagram of an example of application of an embodiment of the present invention.
Figure 13:
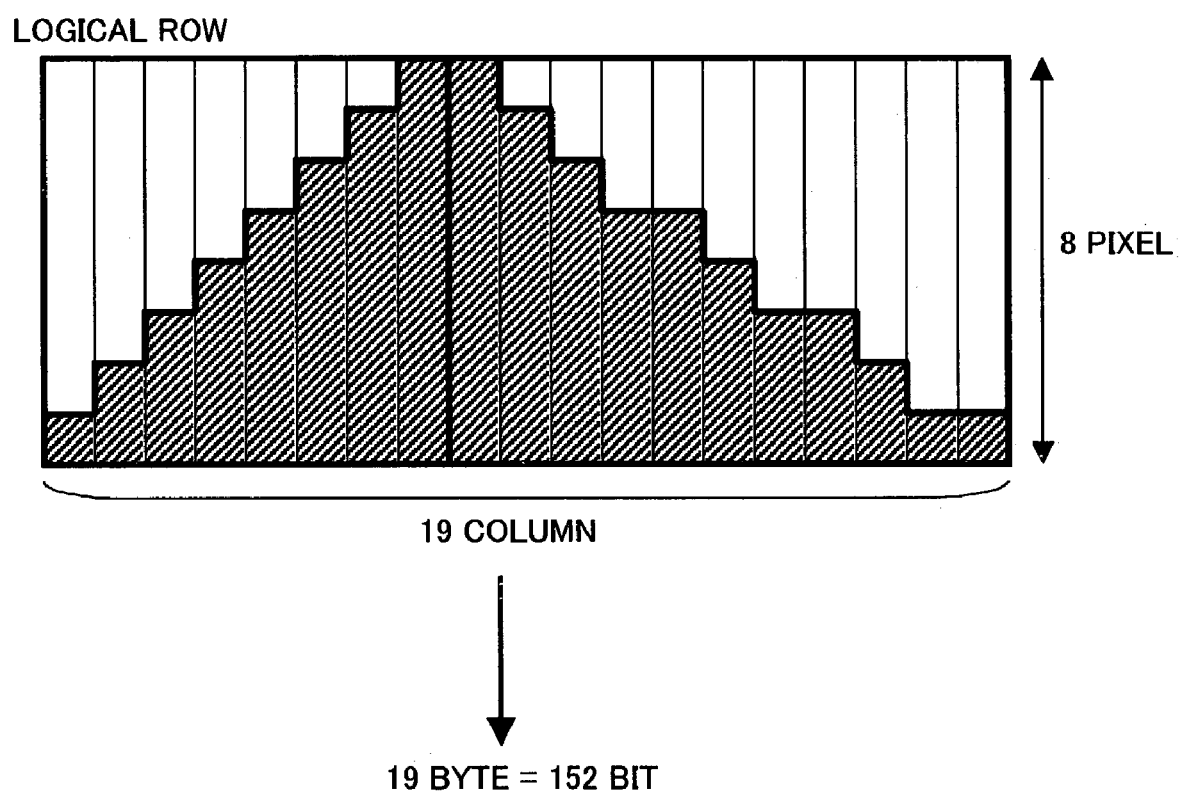
FIG. 13 shows a diagram of encoding according to the compression method of a comparative example.

FIG. 11 is a view showing an example of application illustrating the benefits of the method of compression according to the present invention. FIG. 12 is a diagram of the case where this image is encoded according to the present invention. FIG. 13 is a diagram of encoding of this image according to a prior art method.

FIG. 11 is a detailed view to a larger scale of a pyramid shape J of an ornamental portion of a kanji character R. If the line number L of the logical row is "8", this pyramid shape is an image of 19 columns 8 lines. That is, each column has an 8-bit pixel value.

As shown in FIG. 12, according to the present invention, this pyramid is separated into two patterns: pattern A and pattern B; pattern A is of 8 columns, the pixel value of the leading column being 0x01 in hexadecimal notation or in binary notation 00000001; pattern B is of 11 columns, the pixel value of the leading column being 0xff in hexadecimal notation or =11111111 in binary notation.

When the respective patterns A and B are encoded using the code words of FIG. 10, as shown in FIG. 12, pattern A can be represented by data of 16 bit code size while pattern B is represented by data of 26 bit code size. In contrast, in the case of encoding using the conventional image compression method, as shown in FIG. 13, the 19-column image is output directly, without modification, so the encoding size is 19×8=152 bits. In this way, data compression of a factor of about 1/10 can be achieved i.e. considerable data compression can be achieved.

[Method of Restoration Processing]

Figure 14:
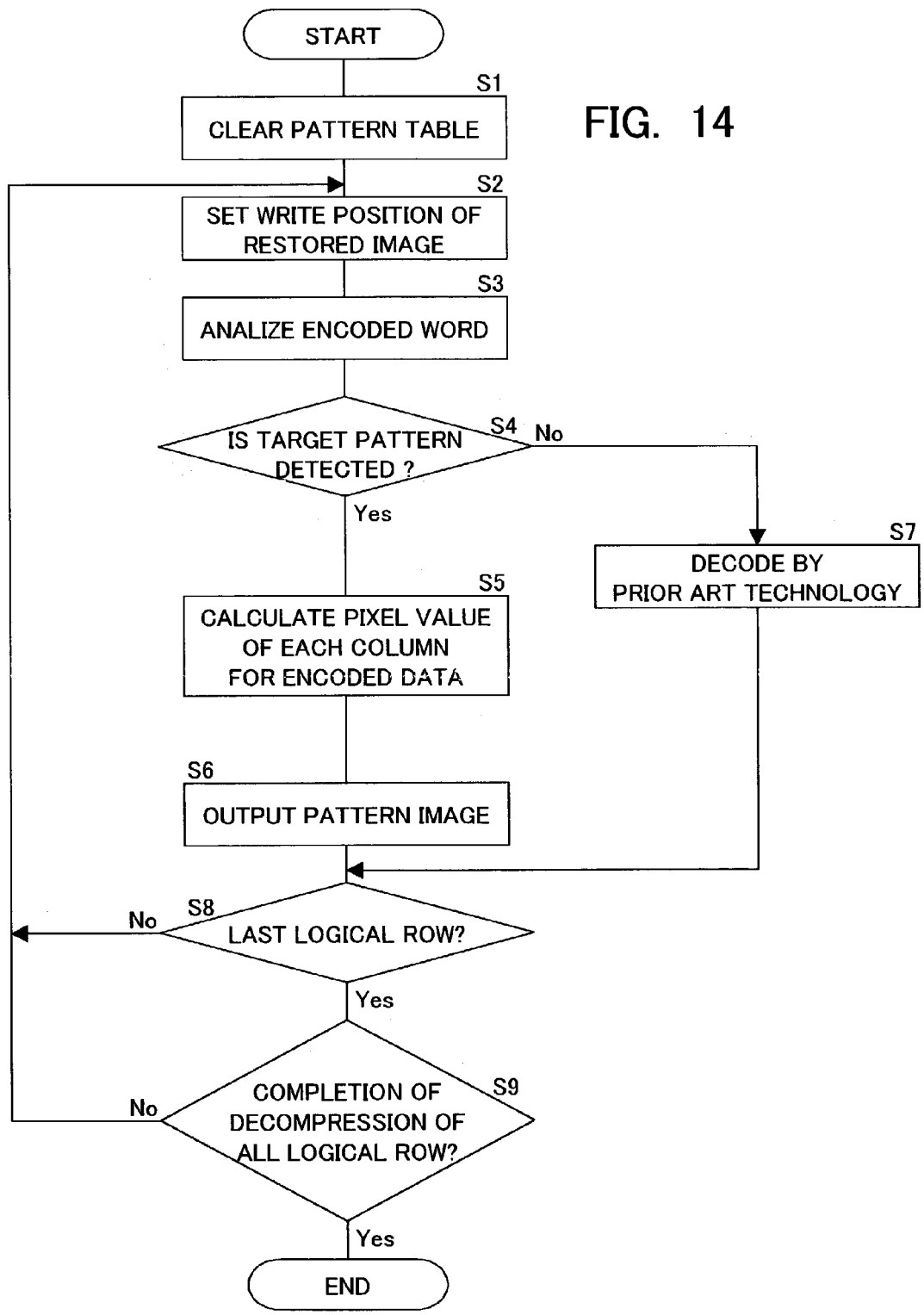
FIG. 14 shows a flow chart of image decompression processing according to an embodiment of the present invention.

FIG. 14 is a flow chart of restoration (decompression) processing for restoring data that has been subjected to image compression according to the present invention.

(S1) The pattern table is cleared to put it in a condition in which no pattern is registered.

(S2) A region for outputting the restored image is set accordance with the current restoration position.

(S3) The type of code word (vertical skip/horizontal skip/separation pattern) is identified by analyzing the encoded data at the current decoding position in the encoded data.

(S4) In accordance with the results of analysis of S3, whether or not the analyzed code word was encoded in accordance with the present invention is identified; if the analyzed code word was encoded in accordance with the present invention (i.e. in the case of a separation pattern), processing advances to S5; otherwise, processing advances to S7.

(S5) From the structure of the code word in accordance with the present invention, the pixel value of each column of the region is calculated and a bit map data pattern is generated. That is, the pixel values of each column are calculated from the direction of change and the amount of change with respect to the pixel values of the leading column.

(S6) This pixel value pattern data is output to the region for writing the restoration image.

(S7) In the case of a code word not in accordance with the present invention (vertical skip/horizontal skip), decoding processing is performed in accordance with the prior art method of restoration and the restored image data is output to the region for writing the restoration image.

(S8) Whether or not the end of the logical row has been reached is identified; if the end of the logical row has not yet been reached, processing returns to S2; if the end of the logical row has been reached, processing advances to S9.

(S9) Whether or not all of the restoration processing of the logical row has been completed is identified; if it has not been completed, processing returns to S2; if it has been completed, restoration processing is terminated.

Image data that has been encoded in accordance with the present invention can be restored to the original image by the above processing.

OTHER EMBODIMENTS

Although, in the embodiment described above, all of the regions containing black pixels of the logical row were taken as the subject of encoding, it would be possible to remove from being the subject of this comparison regions, of these regions, which consist entirely of black pixels or regions having predetermined horizontal lines in the region and to encode these separately.

Also, although an example of application of compression was described in terms of transfer of printing data, application to for example storage in a file would also be possible.

While the invention has been described above with reference to embodiments, the invention could be modified in various ways within the scope of its essence and such modifications are not to be excluded from the scope of the present invention.

As described above, with the method of image compression according to the present invention, vertical and horizontal blank skipping is performed and, in regions other than this, regions where the pixel values change gradually in a specified direction are separated and encoded in accordance with the direction of change and amount of change of the black pixels so the compression factor of portions where the change of pixel values satisfies specific conditions, such as the boundary portions of letters, which were conventionally output without coding, can be improved. This therefore contributes to reduction of the storage capacity for storing data and reduction of the data transmission time.

What is claimed is:

1. A method of image compression comprising:
   a first region separation step of separating into regions containing black pixels and regions not containing black pixels in units of K rows (where K is an integer of one or more) by scanning an image in a main scanning direction;
   a second region separating step of separating regions containing black pixels and regions not containing black pixels in single column units by scanning in an auxiliary scanning direction intersecting said main scanning direction in logical rows defined by L (where L is an integer of one or more) rows including at least one row containing black pixels obtained by the first region separating step;
   a third region separating step of separating regions in which black pixels increase or decrease continuously in the same direction of the auxiliary scanning direction in the logical row in accordance with the separation results of said second region separating step; and
   an encoding step of encoding by using the regions obtained in said first, second and third region separating step as elements;
   wherein the encoding step includes a step of encoding the regions separated by said third region separating step with the number of columns of said region, the pixel value of the leading column of the region and the amount of change of the black pixels of each column of the second and subsequent columns of said region with respect to the immediately preceding column.

2. The method of image compression according to claim 1,
   wherein said third region separating step comprises a step of separating the regions in which black pixels increase or decrease continuously in said same direction with reference to the relationship of black pixels of adjacent columns of said region containing black pixels.

3. The method of image compression according to claim 1,
   wherein said third region separating step comprises a step of separating the regions in which black pixels increase or decrease continuously in said same direction by using the pixel values of adjacent columns to reference a separation criteria table which stores information indicating the subject of detection, the direction of change and the amount of change corresponding to the pixel values of these two columns.

4. The method of image compression according to claim 1,
   wherein said encoding step comprises a step of encoding by using a single code indicating the amount of change when the amount of change of black pixels in each column in the region separated by said third region separating step is constant.

5. The method of image compression according to claim 1,
   wherein said encoding step comprises a step of expressing the code indicating the amount of change of the number of black pixels of each column by N bits satisfying $M \leq 2^N - 1$ (where N is an integer of one or more), when the amount of change of the number of black pixels of each column in the region separated by said third region separating step is a maximum M pixels.

6. A method of image decompression for decompressing compressed data obtained by separating into regions containing black pixels and regions not containing black pixels in units of K rows (where K is an integer of one or more) by scanning an image in a main scanning direction, separating regions containing black pixels and regions not containing black pixels in single column units by scanning in an auxiliary scanning direction intersecting this main scanning direction in logical rows defined by L (where L is an integer of one or more) rows including at least one row containing black pixels, separating into regions in which black pixels increase or decrease continuously in the same direction of the auxiliary scanning direction in the logical row and encoding by using each the separated regions as elements, comprising the steps of:
   analyzing a code word of the region from the compressed data; and
   restoring regions in which black pixels increase or decrease continuously in the same direction of the auxiliary scanning direction in the logical row obtained by said analysis, from the number of columns of the region, the pixel values of the leading column of the region and the amount of change of black pixels with respect to the immediately preceding column of the second and subsequent columns of the region contained in the code word.

7. A computer-readable medium encoded with a computer program, comprising:
   first region separating program data for separating into regions containing black pixels and regions not containing black pixels in units of K rows (where K is an integer of one or more) by scanning an image in a main scanning direction;
   second region separating program data for separating regions containing black pixels and regions not containing black pixels in single column units by scanning in an auxiliary scanning direction intersecting the main scanning direction in logical rows defined by L (where L is an integer of one or more) rows including at least one row containing black pixels obtained by the first region separating program data;

third region separating program data for separating regions in which black pixels increase or decrease continuously in the same direction of the auxiliary scanning direction in the logical row in accordance with the separation results of said second region separating program data; and an encoding program data for encoding by using the regions obtained in said first, second and third region separating program data as elements;

wherein the encoding program data includes program data for encoding the regions separated by said third region separating program data with the number of columns of said region, the pixel value of the leading column of the region and the amount of change of the black pixels of each column of the second and subsequent columns of said region with respect to the immediately preceding column.

8. A computer-readable medium encoded with a computer program for decompressing compressed data obtained by separating into regions containing black pixels and regions not containing black pixels in units of K rows (where K is an integer of one or more), by:

scanning an image in a main scanning direction, separating regions containing black pixels and regions not containing black pixels in single column units by scanning in an auxiliary scanning direction intersecting the main scanning direction in logical rows defined by L (where L is an integer of one or more) rows including at least one row containing black pixels, separating into regions in which black pixels increase or decrease continuously in the same direction of the auxiliary scanning direction in the logical row and encoding by using each the separated regions as elements, comprising:

analyzing program data for analyzing a code word of the region from the compressed data; and restoring program data for restoring regions in which black pixels increase or decrease continuously in the same direction of the auxiliary scanning direction in the logical row obtained by said analysis, from the number of columns of the region, the pixel values of the leading column of the region and the amount of change of black pixels with respect to the immediately preceding column of the second and subsequent columns of the region contained in the code word.

* * * * *